United States Patent [19]
Diamond

[11] Patent Number: 4,754,945
[45] Date of Patent: Jul. 5, 1988

[54] STOWABLE SUPPORT FOR BOOKS AND THE LIKE

[76] Inventor: Harvey E. Diamond, 12953 Woodbridge St., Studio City, Calif. 91604

[21] Appl. No.: 799,394

[22] Filed: Nov. 19, 1985

Related U.S. Application Data

[63] Continuation of Ser. No. 572,700, Jan. 20, 1984, abandoned.

[51] Int. Cl.⁴ .............................................. A47B 97/04
[52] U.S. Cl. ................................... 248/460; 248/454; 248/458; 248/279; 248/284; 248/447
[58] Field of Search ....................... 248/460, 288.1, 276, 248/447, 447.1, 447.2, 462, 464, 465, 284, 279, 454, 457, 445, 460, 447, 197, 278, 458; 403/100, 102, 58; 5/507

[56] References Cited

U.S. PATENT DOCUMENTS

| | | | |
|---|---|---|---|
| 276,791 | 5/1883 | Engle | 403/58 |
| 368,388 | 8/1887 | Drake | 248/460 |
| 751,526 | 2/1904 | Mann | 248/279 |
| 2,362,383 | 11/1944 | Lendinara | 403/58 |
| 3,514,066 | 5/1970 | Singleton | 248/447 |
| 3,555,719 | 1/1971 | Butler | 248/530 X |
| 3,948,476 | 4/1976 | Kuniyosi | 248/447 |

FOREIGN PATENT DOCUMENTS 1525080 9/1978 United Kingdom ................ 248/454

Primary Examiner—Reinaldo P. Machado
Assistant Examiner—Alvin Chin-Shue
Attorney, Agent, or Firm—Drucker & Sommers

[57] ABSTRACT

The invention relates to a means for the compact stowing of a folded support, e.g. for books and the like, when not in use, and to the unfolding thereof, to provide a rigid support in any one of a number of possible positions, from the compact stowed position.

More particularly, the invention provides a four-way movement of a book support means from an initial compact stowed position wherein the support means and its associated mechanisms all lie essentially in a single plane, to a position wherein the support means can be adjusted four ways: (1) rotationally and (2) vertically about a given horizontal axis, (3) laterally with respect to a given vertical axis, and (4) rotationally with respect to that given vertical axis.

20 Claims, 1 Drawing Sheet

STOWABLE SUPPORT FOR BOOKS AND THE LIKE

This application is a continuation of application Ser. No. 572,700, filed 1/20/84 now abandoned.

BRIEF SUMMARY OF THE INVENTION

The invention relates to a means for the compact stowing of a folded support, e.g. for books and the like, when not in use, and to the unfolding thereof, to provide a rigid support in any one of a number of possible positions, from the compact stowed position.

More particularly, the invention provides a four-way movement of a book support means from an initial compact stowed position wherein the support means and its associated mechanisms all lie essentially in a single plane, to a position wherein the support means can be adjusted four ways: (1) rotationally and (2) vertically about a given horizontal axis, (3) laterally with respect to a given vertical axis, and (4) rotationally with respect to that given vertical axis.

DETAILED DESCRIPTION OF THE INVENTION

Figure 1:
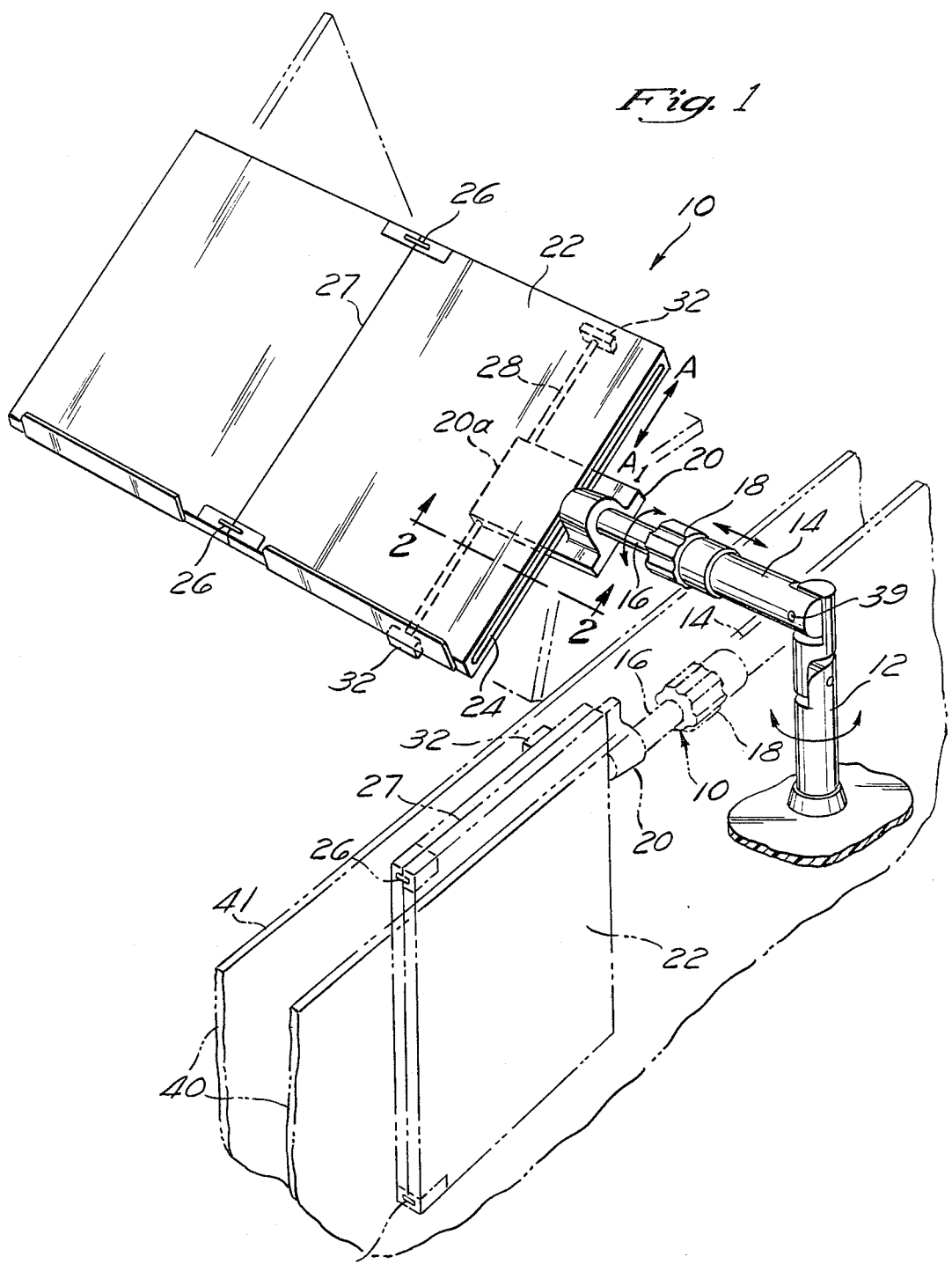
FIG. 1 is a perspective view of the stowable support in user positions, the stowed position being shown in phantom.
Figure 2:
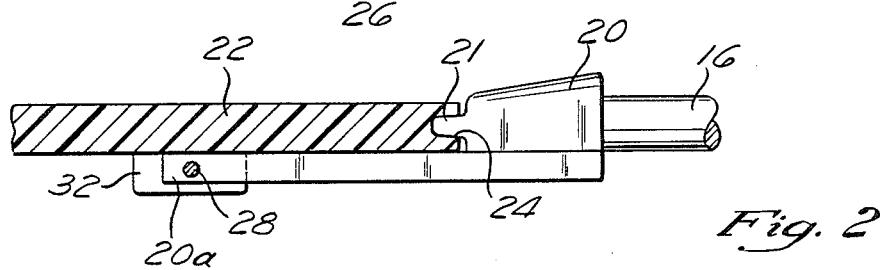
FIG. 2 is a cross-sectional view taken along the line 2—2 of FIG. 1.

The stowable support is designated, generally, by the numeral 10 and comprises an upstanding rotatable stem 12, an arm 14 connected to said stem 12, an arm extension 16 coaxially extending from said arm 14 and being rotatably nut therein and laterally extendable therefrom. A knurled lock mount 18 of conventional construction locks arm extension 16 in any desired angular and lateral relationship to the arm 14.

A link is pivotally connected, at two pivot points, each located proximate one of the opposed ends thereof, and offset generally ninety degrees from each other, to arm 14 and stem 12, as shown in FIG. 1. The adjacent abutting surfaces of arm 14 and the link, at pivot point 39, interact to provide first and second stable positions, with arm 14 respectively extending outwardly from and aligned with the link, which stable positions are generally ninety degrees apart and in a first plane. The adjacent abutting surfaces of stem 12 and the link, at the other pivot point, interact to provide the second and a third stable position, with arm 14 and the link respectively aligned with and extending in stowed position relative to stem 12, which stable positions are generally ninety degrees apart and in a second plane generally perpendicular to the first plane.

Arm extension 16 is provided at its outer end with a bracket means 20 for holding a planar support 22. The bracket means 20 has a tongue 21 slideably extending into a complementary tract or groove 24 formed along one side of support 22 whereby to enable the support 22 to move along the plane of the axis of the groove 24, as indicated by arrows A-A$_1$. The planar support means 22 is hinged at the upper and lower ends thereof, by conventional hinges 26 and the support 22 is thereby foldable along the inge line 27.

The bracket means 20 extends beneath a portion of the support 22 and, together with a rod 28 transversely passing through the distal end 20a of the bracket means, provides a skeletal framework for the support 22. The upper and lower ends of rod 28 terminate within blocks 32 of plastic, wood or metal, these blocks abutting the underside of support means 22 and being adhesively, or otherwise, affixed thereto.

The stowable support is made preferably primarily of plastic.

The stowable support 10 is shown, in FIG. 1, stowed between walls 40, as for example, the walls of an enclosure built into a molded bathtub, piece of furniture, bed, etc.

In the initial stowage position, shown in phantom in FIG. 1, the support means 22, the arm extension 16 and arm 14, and the stem 12 all lie essentially in a single plane. Further, the arm, its extension and the support itself all lie in the stowed position, at a level approximately equal to the level of the uppermost portion of the arm. This type of stowage enables the support means to be neatly stowed in a hollow wall or enclosure, as in a bathtub hollow wall, when not in use.

When use of the bookrest is desired, the support means is quickly moved to the FIG. 1 user position from the stowed (phantom) position by means of a four-way adjustability.

Firstly, the support means 22 is pivoted, or rotated, upwardly in the direction of its initial planar condition in order to clear the upper edge 41 of walls 40 about pivot point 39. Secondly, the support means is rotatably moved, about the stem 12, to a desired angularity. Thirdly, the arm extension 16 of the support means 22 is changed laterally, as desired, and the support angle and lock nut 18 tightened. Fourthly, the height of the support means 22 may be changed, as desired, by normally moving the track 24 of support means 22 along the tongue 21 of bracket 20.

Various modifications will suggest themselves to those skilled in the art. Hence, I intend to be bound only by the claims which follow.

I claim:

1. A stowable support for books and the like, adapted to enable freely pivoted movement thereof, between a stowed position in a structural compartment defined by an inner and outer wall of a structure and projecting position in a plurality of planes relative to the structural compartment and the structure without securing means, which comprises:

stem means adapted to be mounted in said structural compartment;

an arm, adapted to be pivotally attached to the stem means and pivotally movable between the stowed position and the projection position relative to the longitudinal axis of the stem means;

means for pivotally connecting the arm to the stem means, adapted to enable the arm to be freely pivotally movable between the stowed position and the projecting position without securing means, comprising a link, pivotally connected to the arm at a first pivot point and to the stem means a second pivot point, adapted to enable the arm to be freely pivoted about the second pivot point, in a first plane, between the stowed position and a position extending upwardly from the structural compartment, and further adapted to enable the arm and the link to be freely pivoted about said first pivot point in a second plane, between the position extending upwardly from the structural compartment and the projecting position, wherein the projecting the upwardly extending, and the stowed positions are first, second, and third stable positions, respectively; and means for supporting a book or the like attached to said arm by a bracket means, having a tongue, said support means having a groove therein complementary to the tongue in the bracket means for enabling guided movement, at a first location, of the support means relative to the bracket means.

2. The stowable support of claim 1 wherein said stem, arm, pivotally connecting means, and support means are all adapted, in the stowed position, to lie in a single plane for compact stowing of the support.

3. The stowable support of claim 1, further comprising an arm extension, extending between the arm and bracket means and being rotatable, and a rotatable lock nut for preventing rotation of the arm extension.

4. The stowable support of claim 1, in which the stem means are adapted to be rotatable, and in which the pivotally connecting means comprise a pivot pin, adapted to connect the arm and stem means for enabling pivoted movement of the arm relative to the stem means.

5. The stowable support of claim 1, in which the pivotally connecting means comprise a link, adapted to be connected to the arm and stem means, and a plurality of pivot pins, connecting the link to the arm and to the stem means.

6. The stowable support of claim 1, in which the support means includes a plurality of sections, hingedly connected so as to be foldable in the direction of the longitudinal axis thereof for compact stowing of said support means.

7. The stowable support of claim 1, in which the planes in which the arm and support means are positionable in stowed and extended positions are perpendicular to each other.

8. The stowable support of claim 1, wherein the bracket means includes a channel therein, and wherein the support means includes a rod therein which extends through, and is complementary to, the channel in the bracket means for enabling guided movement of the support means relative to the bracket means.

9. The stowable support of claim 1, wherein the bracket means includes at least one channel therein, and wherein the support means includes at least one rod therein which extends through, and are complementary to, each channel in the bracket means for enabling guided movement of the support means relative to the bracket means.

10. A stowable support as in claim 1, in which the arm is freely releasable from and freely pivotable between and into the first, second, and third stable positions thereof, about the first and second pivot points.

11. A stowable support as in claim 1, in which the arm, link, and stem means include facing surfaces proximate the first and second pivot points adapted to abut and interact to prevent further rotation and to stabilize the relative positions thereof.

12. A stowable support as in claim 1, further including an angle included between the first and second stable positions, through which the arm pivots relative to the link and stem means, comprising approximately ninety degrees.

13. A stowable support as in claim 1, further including an angle included between the first and second planes, through which the arm and link pivot, relative to each other and to the stem means, comprising approximately ninety degrees.

14. The stowable support of claim 1, in which the compartment inner wall includes an upper edge, and the arm, pivotally connecting means, and support means, are all adapted, in the stowed position to lie below the upper edge of the compartment inner wall for compact stowing of the support means in the structural compartment.

15. A stowable support as in claim 14, further including an angle included between the second and third stable positions, through which the arm and link pivot relative to the stem means, comprising approximately ninety degrees.

16. A stowable support as in claim 1, in which the support means are rotatably movable about the longitudinal axis of the arm to adjust the angular relationship of the support means to a desired plane of support with respect to the arm.

17. The stowable support of claim 16, further comprising means for limiting the rotation of the support means, so as to limit the angular relationship of the support means relative to the arm.

18. A stowable support as in claim 16 further comprising means for locking the support means to the arm in the desired angular relationship.

19. A stowable support as in claim 1, further comprising means for enabling movement of the support means generally upwardly and downwardly along a desired plane of support relative to the arm to a desired level at one of a plurality of positions intermediate a fully extended up or down positions thereof.

20. The stowable support of claim 19, further comprising means for retaining the support meanst in a selected one of a plurality of positions intermediate the fully extended up or down positions thereof.

* * * * *

UNITED STATES PATENT AND TRADEMARK OFFICE
CERTIFICATE OF CORRECTION

PATENT NO. : 4,754,945

DATED : 7/5/88

INVENTOR(S) : Harvey E. Diamond

It is certified that error appears in the above-identified patent and that said Letters Patent are hereby corrected as shown below:

In Column 2, line 59, after the word "means", add the the word --at--.

Signed and Sealed this

Sixth Day of December, 1988

Attest:

DONALD J. QUIGG

Attesting Officer

Commissioner of Patents and Trademarks